(12) United States Patent
Kopecek et al.

(10) Patent No.: US 10,161,320 B2
(45) Date of Patent: Dec. 25, 2018

(54) METHOD OF OPERATING AN INTERNAL COMBUSTION ENGINE

(71) Applicant: GE Jenbacher GmbH & Co OG, Jenbach (AT)

(72) Inventors: Herbert Kopecek, Schwaz (AT); Andreas Birgel, Innsbruck (AT); Stefan Schiestl, Wiesing (AT); Nikolaus Spyra, Innsbruck (AT); Michael Waldhart, Telfs (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 38 days.

(21) Appl. No.: 14/610,109

(22) Filed: Jan. 30, 2015

(65) Prior Publication Data
US 2015/0233312 A1 Aug. 20, 2015

(30) Foreign Application Priority Data
Feb. 20, 2014 (AT) .................................... 120/2014

(51) Int. Cl.
F02D 41/00 (2006.01)
F02D 41/32 (2006.01)
F02D 41/18 (2006.01)

(52) U.S. Cl.
CPC ......... *F02D 41/0007* (2013.01); *F02D 41/18* (2013.01); *F02D 41/32* (2013.01)

(58) Field of Classification Search
CPC ....... F02D 41/0007; F02D 41/18; F02D 41/32
(Continued)

(56) References Cited

U.S. PATENT DOCUMENTS

| 4,867,127 A | 9/1989 | Quirchmayr et al. |
| 6,029,109 A * | 2/2000 | Rossignol ................. G01L 3/00 |
| | | 701/110 |

(Continued)

FOREIGN PATENT DOCUMENTS

| DE | 197 36 131 | 10/1998 |
| DE | 10 2007 052 476 | 5/2009 |

(Continued)

OTHER PUBLICATIONS

Austrian Patent Office Action Search Report (ASR) dated May 9, 2014 in Austrian Patent Application No. A 120/2014.

(Continued)

*Primary Examiner* — Joseph J Dallo
(74) *Attorney, Agent, or Firm* — Wenderoth, Lind & Ponack, L.L.P.

(57) ABSTRACT

A method of operating an internal combustion engine, in particular a gas engine, comprising at least one combustion chamber to which a charge air is fed with a variable charge pressure and/or a variable amount of charge air, wherein a cylinder pressure value is ascertained from at least one measurement value of a sensor arranged in the at least one combustion chamber, wherein the cylinder pressure value is regulated by altering the charge pressure and/or by altering the amount of charge air as a setting value or values to a cylinder pressure target value, wherein the cylinder pressure target value is selected in dependence on a power of the internal combustion engine.

26 Claims, 9 Drawing Sheets

(58) Field of Classification Search
USPC .............. 123/434, 435, 436, 673, 478, 480, 123/406.47; 701/103–105
See application file for complete search history.

(56) References Cited

U.S. PATENT DOCUMENTS

| | | | | |
|---|---|---|---|---|
| 6,234,141 B1* | 5/2001 | Kerns | .................... | F02D 35/023 |
| | | | | 123/179.16 |
| 6,360,726 B1* | 3/2002 | Javaherian | .......... | F02D 41/0025 |
| | | | | 123/435 |
| 6,425,373 B1* | 7/2002 | Robichaux | .............. | F02D 37/02 |
| | | | | 123/350 |
| 6,668,812 B2* | 12/2003 | Javaherian | .......... | F02D 41/0085 |
| | | | | 123/406.24 |
| 6,694,960 B2* | 2/2004 | Hess | .................... | F02D 35/023 |
| | | | | 123/436 |
| 7,027,910 B1* | 4/2006 | Javaherian | .......... | F02D 41/0085 |
| | | | | 123/406.24 |
| 7,246,594 B2* | 7/2007 | Hartmann | ................ | F02D 17/02 |
| | | | | 123/198 F |
| 7,377,260 B2* | 5/2008 | Jehle | ........................ | F02P 5/151 |
| | | | | 123/406.2 |
| 7,520,179 B2* | 4/2009 | Bernstein | ................. | G01L 1/165 |
| | | | | 73/801 |
| 8,136,513 B2 | 3/2012 | Schiestl et al. | | |
| 8,695,567 B2* | 4/2014 | Javaherian | .......... | F02D 41/1497 |
| | | | | 123/435 |
| 2003/0216853 A1* | 11/2003 | Jacobson | .............. | F02D 35/023 |
| | | | | 701/106 |
| 2005/0205063 A1* | 9/2005 | Kolmanovsky | ........... | F01L 9/04 |
| | | | | 123/436 |
| 2006/0064232 A1* | 3/2006 | Ampunan | ................. | B60T 7/16 |
| | | | | 701/115 |
| 2008/0060861 A1* | 3/2008 | Baur | ....................... | A63G 25/00 |
| | | | | 180/65.6 |
| 2012/0103307 A1* | 5/2012 | Javaherian | .......... | F02D 41/1497 |
| | | | | 123/436 |
| 2013/0298869 A1 | 11/2013 | Hirzinger et al. | | |
| 2014/0052362 A1* | 2/2014 | Barth | .................... | F02D 41/008 |
| | | | | 701/104 |
| 2014/0052363 A1* | 2/2014 | Barth | .................... | F02D 19/024 |
| | | | | 701/111 |

FOREIGN PATENT DOCUMENTS

| | | |
|---|---|---|
| DE | 10 2012 021 778 | 5/2014 |
| EP | 0 259 382 | 10/1989 |
| EP | 1 162 357 | 12/2001 |
| EP | 1 662 121 | 5/2006 |
| EP | 2 698 520 | 2/2014 |
| EP | 2 698 521 | 2/2014 |
| JP | 63-502680 | 10/1988 |
| JP | 2003-97314 | 4/2003 |
| JP | 2003-328764 | 11/2003 |
| JP | 2007-211729 | 8/2007 |
| JP | 2009-133284 | 6/2009 |
| JP | 2009-185718 | 8/2009 |
| JP | 2013-148019 | 8/2013 |
| WO | 2012/097389 | 7/2012 |

OTHER PUBLICATIONS

European Search Report (ESR) dated Jun. 22, 2015 in parallel European Patent Application EP 15 00 0277.

* cited by examiner

METHOD OF OPERATING AN INTERNAL COMBUSTION ENGINE

BACKGROUND OF THE INVENTION

1. Field of the Invention

The invention concerns a method of operating an internal combustion engine, in particular a gas engine, comprising at least one combustion chamber to which a charge air is fed with a variable charge pressure and/or a variable amount of charge air, wherein a cylinder pressure value is ascertained from at least one measurement value of a cylinder pressure sensor arranged in the at least one combustion chamber, wherein the cylinder pressure value is regulated by altering the charge pressure and/or by altering the amount of charge air to a cylinder pressure target value, wherein the cylinder pressure target value is selected in dependence on a power of the internal combustion engine; and a regulating device and an internal combustion engine for carrying out the proposed method.

2. Description of the Related Art

One of the main influencing factors in relation to nitrogen oxide emissions ($NO_x$ emissions) of an internal combustion engine is the ratio of air to fuel, which is also known as the lambda value.

It is known in the state of the art that there is a substantially linear relationship between charge pressure and power output of the internal combustion engine, with the requirement of achieving substantially constant $NO_x$ emissions. Thus, EP 0 259 382 B1 discloses a method of regulating the air to fuel ratio or the lambda value of a fuel-air mixture fed to an internal combustion engine, in dependence on the power output of the internal combustion engine, with the aim of substantially constant $NO_x$ emissions, by presetting a target value for the charge pressure, that is dependent on the power of the internal combustion engine, and varying the fuel-air ratio until the actual charge pressure corresponds to the predetermined target value.

By virtue of that kind of regulation, it is admittedly possible to dispense with the provision of a lambda probe for ascertaining the fuel-air ratio, but in that respect, the fact is not taken into consideration that the actual main factor for the production of $NO_x$ emissions is not the charge pressure of the charge air fed to the combustion chambers, but the mass of air which is available for combustion in the combustion chambers. In that respect, the mass of air present in the combustion chambers may be subjected during the period of operation of the internal combustion engine to variations which can be caused, for example, by wear phenomena at the inlet or exhaust valves for the combustion chambers.

Approaches for regulating the mass of air fed to the internal combustion engine are known from the state of the art. EP 1662121 describes a method of controlling an internal combustion engine, wherein the estimated total mass of gas serves as an input parameter for a control device of the internal combustion engine. For that purpose, for example, a fed mass of gas is calculated from the combustion chamber pressure and that estimated value is passed to the control means of the intake system.

EP 1162357 describes a method comprising detecting a combustion chamber pressure and inferring therefrom the charge pressure or the exhaust gas back pressure of the internal combustion engine. The aim of that specification is to be able to dispense with a charge pressure sensor or an exhaust gas back pressure sensor by the relationship of combustion chamber pressure and the charge pressure or the exhaust gas back pressure.

EP 2698521 describes a method of taking account of individual cylinder differences. In that case, cylinder signals of the cylinders are not set to a common target value but a suitable cylinder target value is set for each cylinder, by means of which target value the cylinder-individual differences in cylinder parameters can be taken into account.

DE 10 2012 021778 discloses a method of compensating for deviations in degree of delivery in a mixture-charged gas engine, wherein an amount of combustion gas fed to the individual prechambers is so adapted that deviations in degree of delivery which are individual to a cylinder or cylinder bank are compensated for.

SUMMARY OF THE INVENTION

The object of the invention is to avoid the above-described disadvantages and to provide a method of operating an internal combustion engine, that is improved over the state of the art, and a correspondingly improved regulating device and internal combustion engine. In particular, the proposed method seeks to make it possible to take into account changes in the mass of air in the combustion chambers.

In a method according to the invention, that object is attained by features described herein.

According to the invention therefore it is provided that, by altering the charge pressure and/or by altering the amount of charge air, the cylinder pressure value is adaptively adjusted to a cylinder pressure target value dependent on a power of the internal combustion engine.

The cylinder pressure in a combustion chamber or cylinder is representative of the mass of air or the cylinder filling in that combustion chamber. It is therefore possible to draw conclusions about the mass of air present in the combustion chamber, by ascertaining the cylinder pressure in the combustion chamber.

Sensors suitable for the method described in this application must be capable of recording the characteristic of the compression curve, that is to say, the pattern of compression prior to ignition, and not merely a peak pressure.

Additional effects are naturally superimposed on the compression curve due to ignition and combustion of the mixture. In order to be able to meaningfully infer the mass of air present in the combustion chamber, the characteristic of the compression curve prior to combustion is detected.

The cylinder pressure in a combustion chamber can be ascertained in different ways. Besides cylinder pressure sensors which are generally piezoelectric or piezoresistive in operation, other sensors can basically also be considered.

When hereinafter reference is made to "cylinder pressure measurements", that therefore also embraces measurements by sensors which do not directly determine the cylinder pressure, but for example, produce a signal which is characteristic of the cylinder pressure or a signal which can be converted by calculation into the cylinder pressure. The term sensors in this application therefore embraces all sensors which are suitable for determining the cylinder pressure in accordance with the described requirements.

The particular advantage of the present invention is that the target parameter for regulation is the cylinder pressure (and not, for example, the charge pressure) and that the cylinder pressure target value is derived from the power output of the internal combustion engine. In that way, regulation of the internal combustion engine is effected with substantially better success than with methods known from the state of the art since, because of different through-flow coefficients in gas exchange and valve control, charge pressure and cylinder pressure are not to be converted into each other as a trivial matter.

By regulation to the cylinder pressure which is selected in dependence on power, those influencing parameters do not need to be separately taken into consideration, but regulation acts precisely on the parameter which is crucial for emissions.

There are a number of possible options for determining the mass of air or cylinder filling.

Thus, cylinder filling can be determined from a single value from the compression line of the cylinder pressure prior to ignition at a certain position (for example, 50 degrees crankshaft angle before a top dead center point (TDC) of a piston delimiting the combustion chamber). It is also possible to average a plurality of values (for example, 21 values from a range of between 50 degrees crankshaft angle and 48 degrees crankshaft angle before a top dead center point of the piston with a resolution of 0.1 degree crankshaft angle).

Cylinder filling can also be determined by polytropic extrapolation to the bottom dead center point or another point on the compression line by means of the following polytropic equation:

$$p_1 = p_2 \cdot \left(\frac{V_2}{V_1}\right)^n$$

wherein n represents a polytropic exponent which is determined from the heat transfer conditions in the cylinder and the gas composition and is kept constant, $V_1$ represents a volume in the cylinder at a first moment in time (for example, at bottom dead center, known from the geometrical conditions of the engine), $V_2$ represents a volume in the cylinder at a second moment in time (for example, 50 degrees crankshaft angle before TDC, known from the geometrical conditions of the engine), $p_2$ represents a pressure in the cylinder at the second moment in time from a measurement (for example, at 50 degrees crankshaft angle before TDC or from averaging of measurement points from a range of between 50 degrees crankshaft angle and 48 degrees crankshaft angle before TDC) and $p_1$ represents a calculated pressure in the cylinder at the first moment in time.

That polytropic extrapolation can also be performed for a plurality of points on the compression line. The median or mean value of the values of $p_1$ can in that case be used as a measurement for cylinder filling.

That method can also be so applied that the deviation between a calculated and a measured cylinder pressure curve is minimized at discrete points, in a window or over the entire compression phase. In a possible method, a start value for the first point (for example, at the bottom dead center point) is calculated from a second point (for example, at a 50 degrees crankshaft angle before TDC). Then, for a defined window (for example, between 90 and 30 degrees crankshaft angle before TDC) values for $p_2$ are calculated in that window from the polytropic equation and the deviation relative to the measured value is determined for each value. The start value for the first point (for example, at bottom dead center) can then be varied with an optimization algorithm in order to minimize the deviation between the measured and the calculated values in the defined window (for example, between 90 and 30 degrees crankshaft angle before TDC). That value for $p_1$ which involves the smallest deviation can be utilized as a characteristic value for cylinder filling.

A further possible way of determining cylinder filling is afforded by process calculation. In that case, the mass of air in the cylinder can be calculated from the energy liberated in the cylinder (for example, from the integrated heating law) and a characteristic value for the fuel-air ratio.

Depending on the power output of the internal combustion engine, there is a substantially linear relationship between a cylinder pressure target value and the power of the internal combustion engine, for the purpose of achieving substantially constant $NO_x$ emissions.

That cylinder pressure target value which can be predetermined for each power output of the internal combustion engine applies, for example, for a new internal combustion engine and can be suitably calibrated upon commissioning of the internal combustion engine and can be stored, for example, in an operating characteristic.

However, the respectively currently prevailing value of the cylinder pressure can change over the period of operation of the internal combustion engine due to wear phenomena. Upon a deviation in the cylinder pressure value from the cylinder pressure target value, the respective cylinder pressure value can be adjusted, by altering the charge pressure of the charge air and/or by altering the amount of charge air, to the cylinder pressure target value which is dependent on the respective power point of the internal combustion engine and the respective default value for $NO_x$ emissions so that, in spite of the wear phenomena, the operating point of the internal combustion engine (power and $NO_x$ emissions of the internal combustion engine) can be maintained.

By increasing the charge pressure of the charge air fed to the combustion chamber, a larger mass of air takes part in the compression and combustion and the cylinder pressure reaches a higher value.

If the amount of charge air fed to the combustion chamber is increased, a larger mass of air takes part in the compression and combustion and the cylinder pressure reaches a higher value.

The term charge air is employed broadly in the context of the present invention and includes, for example, an air-fuel mixture (for example, for mixture-charged internal combustion engines) or substantially only air (for example, for air-charged internal combustion engines).

In a particularly preferred embodiment, it can be provided that the at least one measurement value is ascertained prior to an ignition in the combustion chamber, preferably in a range of between about 30 and 55 degrees crankshaft angle before a top dead center position of a piston delimiting the combustion chamber, particularly preferably at approximately a 35 degrees crankshaft angle before the top dead center position of the piston or at approximately a 49 degrees crankshaft angle before the top dead center position of the piston. The entire variation with respect to time in the cylinder pressure during a combustion cycle can also be utilized for ascertaining the cylinder pressure value. It can also be provided that discrete measurement points for the cylinder pressure are ascertained during a combustion cycle and the cylinder pressure value is ascertained therefrom. As cylinder pressure measurements are frequently carried out for monitoring of combustion processes, in the region of substantially 49 degrees crankshaft angle before the top dead center point of the piston, in accordance with a preferred embodiment, it can be provided that those cylinder pressure measurements are utilized for ascertaining the cylinder pressure value.

That embodiment of the invention is particularly advantageous in which at least two and preferably all combustion chambers of the internal combustion engine are respectively equipped with a sensor for determining the cylinder pressure, wherein a respective cylinder-individual pressure value of the combustion chamber in question is ascertained from at least one measurement value of a sensor, wherein the cylinder pressure value is ascertained from the cylinder-individual pressure values of the combustion chambers. In that case, the median or the arithmetic mean value of the ascertained cylinder-individual pressure values of the combustion chambers can preferably be ascertained as the cylinder pressure value. In that way, it is possible to take account of variations in all combustion chambers of the internal combustion engine in relation to the mass of air present in the combustion chambers.

In a particularly preferred embodiment, it can be provided that the respective cylinder pressure target value is predetermined from an operating characteristic which contains an association of cylinder pressure target value with power of the internal combustion engine in dependence on the power of the internal combustion engine for substantially constant values for nitrogen oxide emissions. The operating characteristic or power-dependent cylinder pressure target value curve can be experimentally ascertained, for example, for calibration upon commissioning of the engine, with the aim of achieving substantially constant values for $NO_x$ emissions for respectively different values with respect to the power output of the internal combustion engine.

The operation of determining the cylinder pressure is preferably effected in each compression cycle, but it can also be provided that measurement is effected at intervals, for example, only every tenth time.

In that respect, it is to be borne in mind that the above-mentioned substantially linear relationship between cylinder pressure target value and power output of the internal combustion engine, with substantially constant $NO_x$ emissions (operating characteristic) applies only for constant boundary conditions like, for example, charge air temperature, air humidity or ignition time. Therefore, a plurality of such operating characteristics can be ascertained for various boundary conditions, for example, for different charge air temperatures, air humidity levels or different ignition times (for example, also by correction functions) and stored. It can also be provided that the operating characteristic is adapted in accordance with suitable correction functions to the respective boundary conditions.

The power output or a power equivalent of the internal combustion engine can be determined, for example, from a delivered electric power of an electric generator coupled to the internal combustion engine. It can also be ascertained in the form of a mechanical power from rotary speed and torque of the internal combustion engine or from electric power and level of efficiency of the generator. If the power consumption of the consumer is known by way of the rotary speed of the internal combustion engine or the generator, it can also be ascertained by way of the rotary speed. The power or a power equivalent of the internal combustion engine can also be determined from a median or mean value of cylinder-individual power contributions (for example, indicated or effective mean pressures in the combustion chambers of the internal combustion engine) in per se known manner. A power which is averaged over all cylinders can be calculated from the power contributions and a target cylinder pressure can be determined therefrom. If there is a deviation in relation to that target cylinder pressure, the charge pressure can be varied and thus the delta from target to actual cylinder pressure can be minimized.

Alternatively, a cylinder-individual target cylinder pressure can be determined from the power contribution determined for an individual cylinder. On the basis thereof, the delta of target in relation to actual cylinder pressure is minimized in cylinder-individual fashion. That variant presents itself if the cylinder pressure can be regulated in cylinder-individual fashion, as for example, in the case of a variable valve gear.

That embodiment of the invention is particularly advantageous in which the charge air is fed to the at least one combustion chamber by way of an air feed conduit, wherein the charge pressure is varied by adjustment of at least one adjusting device arranged in the air feed conduit, preferably by adjustment of a compressor bypass value and/or a throttle flap. In that case, the compressor bypass valve for bypassing the compressor can be arranged in a compressor bypass conduit which connects a compressor inlet to a compressor outlet.

In a further embodiment, it can be provided that the amount of charge air fed to at least one combustion chamber is varied by way of a variable valve gear. With a variable valve gear, the valve opening times and/or the valve lift curves and/or the lobe separation of inlet and exhaust valves can be varied. If, for example, a cylinder pressure is to be increased, the variable valve gear can be so influenced that, in the filling process considered, a larger amount of air is fed to at least one cylinder.

According to a further embodiment, it can be provided that the charge air is fed to the at least one combustion chamber by way of an air feed conduit equipped with a compressor, wherein the compressor is coupled to an exhaust gas turbine in an exhaust gas conduit of the internal combustion engine, wherein the charge pressure is varied by displacement of turbine blades of the exhaust gas turbine or by adjustment of an exhaust gas turbine bypass valve in the exhaust gas conduit, wherein the exhaust gas turbine bypass valve is arranged for bypassing the exhaust gas turbine in an exhaust gas bypass conduit which directly connects an exhaust gas turbine inlet to an exhaust gas turbine outlet. Due to the mechanical coupling of the exhaust gas turbine to the compressor, changes which involve the speed of rotation of the exhaust gas turbine also act on the speed of rotation of the compressor and thus on the charge pressure. In that case, the adjustable turbine blades of the exhaust gas turbine can be in the form of so-called variable turbine geometry. A so-called waste gate can be provided as the exhaust gas turbine bypass valve.

According to a particularly preferred embodiment, it can be provided that a fuel-air mixture including the charge air is introduced into the at least one combustion chamber, wherein the charge pressure is varied by adjustment of a fuel-air ratio of the fuel-air mixture, by the charge pressure of the charge air being adjusted in dependence on the power of the internal combustion engine upon and/or after a variation in the fuel-air ratio of the fuel-air mixture.

In that case, upon a deviation in the cylinder pressure value from the cylinder pressure target value the fuel-air ratio of the fuel-air mixture is varied. By virtue of that variation in the fuel-air ratio, it would be possible to set a varied power output for the internal combustion engine without further interventions. Such an unwanted change in power output is counteracted by the charge pressure of the charge air being altered in dependence on the power output of the internal combustion engine to keep the power output of the internal combustion engine substantially constant. The cylinder pressure value is adaptively adjusted to the cylinder pressure target value by such a change in the charge pressure of the charge air. The alteration in the charge pressure or the mass of air of the charge air in dependence on the power of the internal combustion engine can in that case be implemented by a power regulator known in the state of the art.

Particularly for mixture-charged internal combustion engines, it can be provided that as a fuel-air mixture the charge air is fed to the at least one combustion chamber by way of an air feed conduit equipped with a mixer, wherein a fuel conduit for the introduction of fuel and an air conduit for the introduction of air open into the mixer and a mixer outlet of the mixer opens into the air feed conduit, wherein the fuel-air ratio of the charge air is varied by adjustment of a mixer bypass valve, wherein the mixer bypass valve for bypassing the mixer is arranged in a mixer bypass conduit directly connecting the air conduit to the mixer outlet.

It can also be provided that the fuel-air ratio of the charge air is altered by adjustment of a fuel valve arranged in the fuel conduit, wherein the amount of fuel fed to the mixer by way of the fuel conduit is varied by a change in the position of the fuel valve.

Particularly for air-charged internal combustion engines, it can be provided that the fuel-air mixture includes the charge air and a fuel, wherein the charge air is fed to the at least one combustion chamber by way of an air feed conduit and the fuel is fed to the at least one combustion chamber by way of a fuel feed conduit equipped with at least one fuel metering valve, wherein the fuel-air ratio of the fuel-air mixture is varied by altering a position of the at least one fuel metering valve. The at least one fuel metering valve in that case can be a so-called port injection valve.

A regulating device for regulating a cylinder pressure value of an internal combustion engine equipped with at least one combustion chamber can also be provided.

In addition, an internal combustion engine can also be provided.

In a proposed regulating device for regulating a cylinder pressure value of an internal combustion engine equipped with at least one combustion chamber, wherein a charge air can be introduced with a variable charge pressure into the at least one combustion chamber by way of an air feed conduit of the internal combustion engine, wherein the at least one combustion chamber is equipped with a sensor for determining the cylinder pressure, wherein at least one measurement value of the sensor can be signaled to the regulating device by way of a signal line, wherein there is provided a power measuring device for ascertaining a power of the internal combustion engine, wherein the power can be signaled to the regulating device by way of a further signal line, it is provided that the regulating device ascertains the cylinder pressure value from the at least one measurement value of the sensor, wherein in the event of a deviation of the cylinder pressure value from a cylinder pressure target value dependent on the power of the internal combustion engine, the regulating device for altering the charge pressure signals an adjusting signal by way of a control line to at least one adjusting device until the cylinder pressure value and the cylinder pressure target value coincide, wherein preferably the at least one adjusting device is arranged in the air feed conduit or in an exhaust gas conduit of the internal combustion engine.

A proposed internal combustion engine has at least one combustion chamber equipped with a cylinder pressure sensor and a proposed regulating device. A throttle flap or a compressor bypass valve can be provided, for example, in the air feed conduit as the adjusting device.

Alternatively or additionally, an exhaust gas turbine coupled to a compressor disposed in the air feed conduit and having adjustable turbine blades and/or an exhaust gas turbine bypass valve for bypassing the exhaust gas turbine can be provided in an exhaust gas conduit of the internal combustion engine as the adjusting device.

Particularly in the case of mixture-charged internal combustion engines which are equipped with a mixer in the air feed conduit, a mixer bypass valve for bypassing the mixer or a fuel valve in a fuel conduit opening into the mixer can be provided as the adjusting device.

Particularly in the case of air-charged internal combustion engines in which fuel can be introduced into the at least one combustion chamber by way of a fuel feed conduit, at least one fuel metering valve (for example, a port injection valve) can be arranged in the fuel feed conduit as the adjusting device.

BRIEF DESCRIPTION OF THE DRAWINGS

Further details and advantages of the present invention will be described by means of the specific description hereinafter. In the drawings.

DETAILED DESCRIPTION OF THE INVENTION

Figure 1:
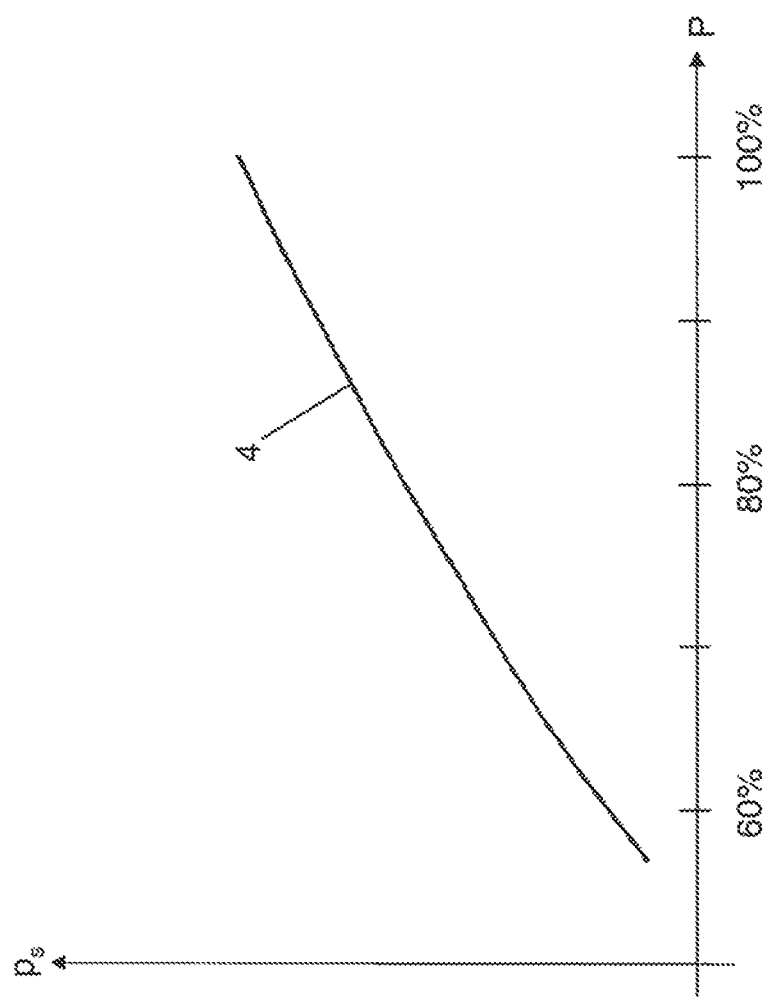
FIG. 1 shows the example of an operating characteristic for presetting a cylinder pressure target value in dependence on the power output of an internal combustion engine.

FIG. 1 shows, by way of example, the relationship between cylinder pressure target value $p_s$ and power P of an internal combustion engine 1 (not shown here) on the assumption of substantially constant $NO_x$ emissions from the internal combustion engine 1. As can be seen from this view, there is an almost linear relationship between the cylinder pressure target value $p_s$ and the power P of the internal combustion engine 1. The percentages of the power P relate to a nominal power of the internal combustion engine 1 which can be in the form of a stationary gas engine coupled to a generator.

Figure 2:
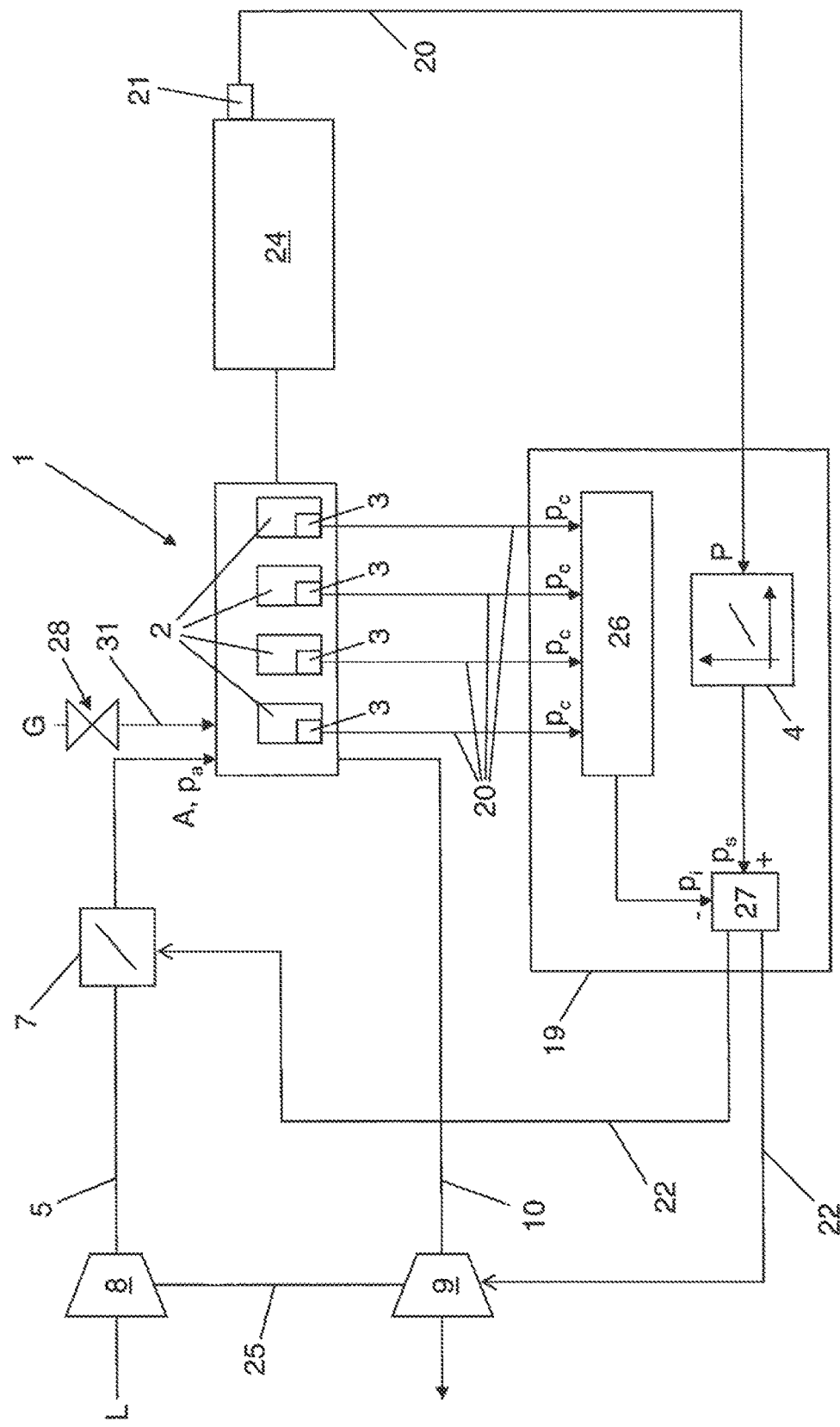
FIGS. 2 through 8 show schematic block circuit diagrams of examples of various embodiments of the proposed internal combustion engine, and FIG. 9 diagrammatically shows the cylinder pressure pattern in an engine, plotted as a graph of combustion chamber pressure in relation to crankshaft angle.

FIG. 2 shows a schematic block circuit diagram illustrating an internal combustion engine 1 connected in a known manner to an electric generator 24, wherein the generator 24 can deliver electric energy to a power supply network (not shown here) connected to the generator 24. In this example, the internal combustion engine 1 has four combustion chambers 2 which are each equipped with a sensor 3 suitable for determining the cylinder pressure. The combustion chambers 2 are supplied with charge air A by way of an air feed conduit 5. In the illustrated example, the air feed conduit 5 has a compressor 8 which is connected in a known manner by way of a turbocharger shaft 25 to an exhaust gas turbine 9 in an exhaust gas conduit 10 of the internal combustion engine 1.

In this example, air L is introduced into the air feed conduit 5, compressed by the compressor 8 and fed to the combustion chambers 2 as charge air A at a charge pressure $p_a$. The illustrated internal combustion engine 1 is an air-charged engine in which, in addition to the charge air A, a fuel G in the form of combustion gas is fed to the combustion chambers 2 by way of a fuel feed conduit 31. That can be effected, for example, by suitable fuel metering valves 28 (for example, port injection valves) which can individually meter a desired amount of fuel for each combustion chamber 2.

Data $p_c$ of the sensors 3 is signaled to a regulating device 19 by way of suitable signal lines 20. In this example, the regulating device 19 has an actual value ascertaining means 26 which ascertains a cylinder pressure value $p_i$ from the signaled data $p_c$, for example by respective cylinder-individual pressure values of the combustion chambers 2 being ascertained from the data $p_c$ from the sensors 3 and by the median or the arithmetic mean value of the ascertained cylinder-individual pressure values of the combustion chambers 2 being ascertained as the cylinder pressure value $p_1$.

In this example, the power P of the internal combustion engine 1 is ascertained by the electric power delivered by the generator 24 being ascertained by a power measuring device 21 and signaled to the regulating device 19 by way of a signal line 20. The electric power of the generator 24 substantially corresponds to the power P delivered by the internal combustion engine 1.

The cylinder pressure target value $p_s$ provided for the corresponding power point P of the internal combustion engine 1 is ascertained by way of an operating characteristic 4 stored in the regulating device 19. A regulator 27 of the regulating device 19 ascertains whether there is a deviation from the cylinder pressure value $p_i$ in relation to the cylinder pressure target value $p_s$. If such a deviation exists, corresponding adjusting signals are signaled by way of control lines 22 to corresponding adjusting devices, wherein the charge pressure $p_a$ is altered by setting of the adjusting devices until the cylinder pressure value $p_i$ is coincident with the cylinder pressure target value $p_s$.

In the illustrated embodiment, a first adjusting device is provided in the form of a throttle flap 7 in the air feed conduit 5, which can be actuated with a corresponding adjusting signal by way of a control line 22 from the regulating device 19. As a further adjusting device, it is provided that the exhaust gas turbine 9 of the turbocharger involves a variable turbine geometry, wherein a suitable adjusting signal can be signaled to the exhaust gas turbine 9 from the regulating device 19 by way of a control line 22. Therefore, by altering the position of the throttle flap 7 and/or by altering the turbine geometry of the exhaust gas turbine 9, it is possible to achieve a corresponding change in the charge pressure $p_a$ until the cylinder pressure value $p_i$ and the cylinder pressure target value $p_s$ coincide.

Figure 3:
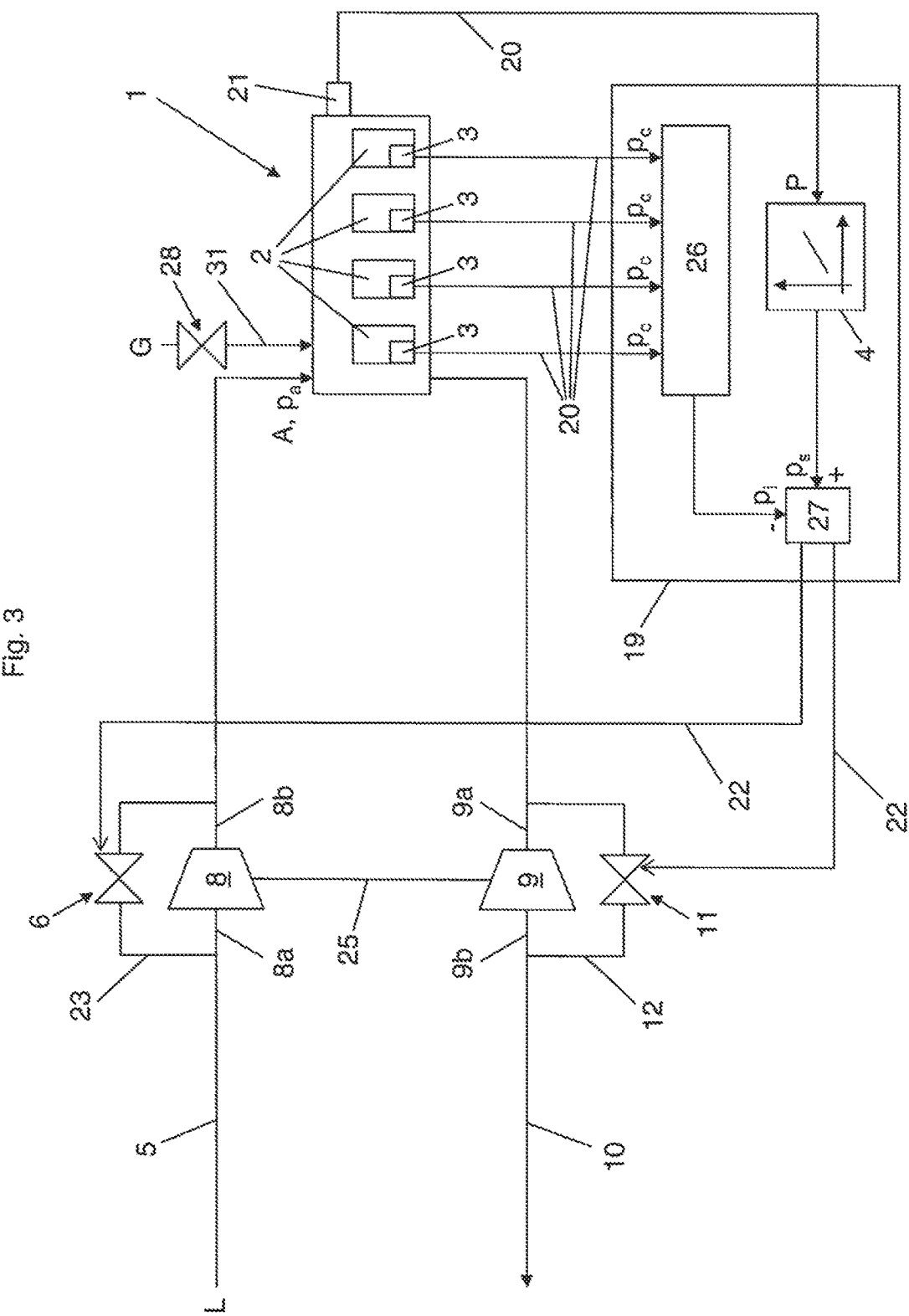

FIG. 3 shows a further example of a proposed internal combustion engine 1, wherein, in this example, the power P of the internal combustion engine 1 is ascertained directly at the internal combustion engine 1 by a power measuring device 21 arranged at the internal combustion engine 1 and is signaled to the regulating device 19 by way of a signal line 20. In this example, the air feed conduit 5 does not have a throttle flap 7, but here a compressor bypass valve 6 for bypassing the compressor 8 is disposed as the adjusting device in a compressor bypass conduit 23 connecting a compressor inlet 8a directly to a compressor outlet 8b. To alter a valve position of the compressor bypass valve 6, an adjusting signal can be signaled to the compressor bypass valve 6 from the regulating device 19 by way of a control line 22. In this example, provided at the exhaust gas side as a further adjusting device, is an exhaust gas turbine bypass valve 11 for bypassing the exhaust gas turbine 9 in an exhaust gas bypass conduit 12 connecting an exhaust gas turbine inlet 9a directly to an exhaust gas turbine outlet 9b, wherein to alter a valve position of the exhaust gas turbine bypass valve 11, an adjusting signal can be signaled to the exhaust gas turbine bypass valve 11 from the regulating device 19 by way of a control line 22.

Figure 4:
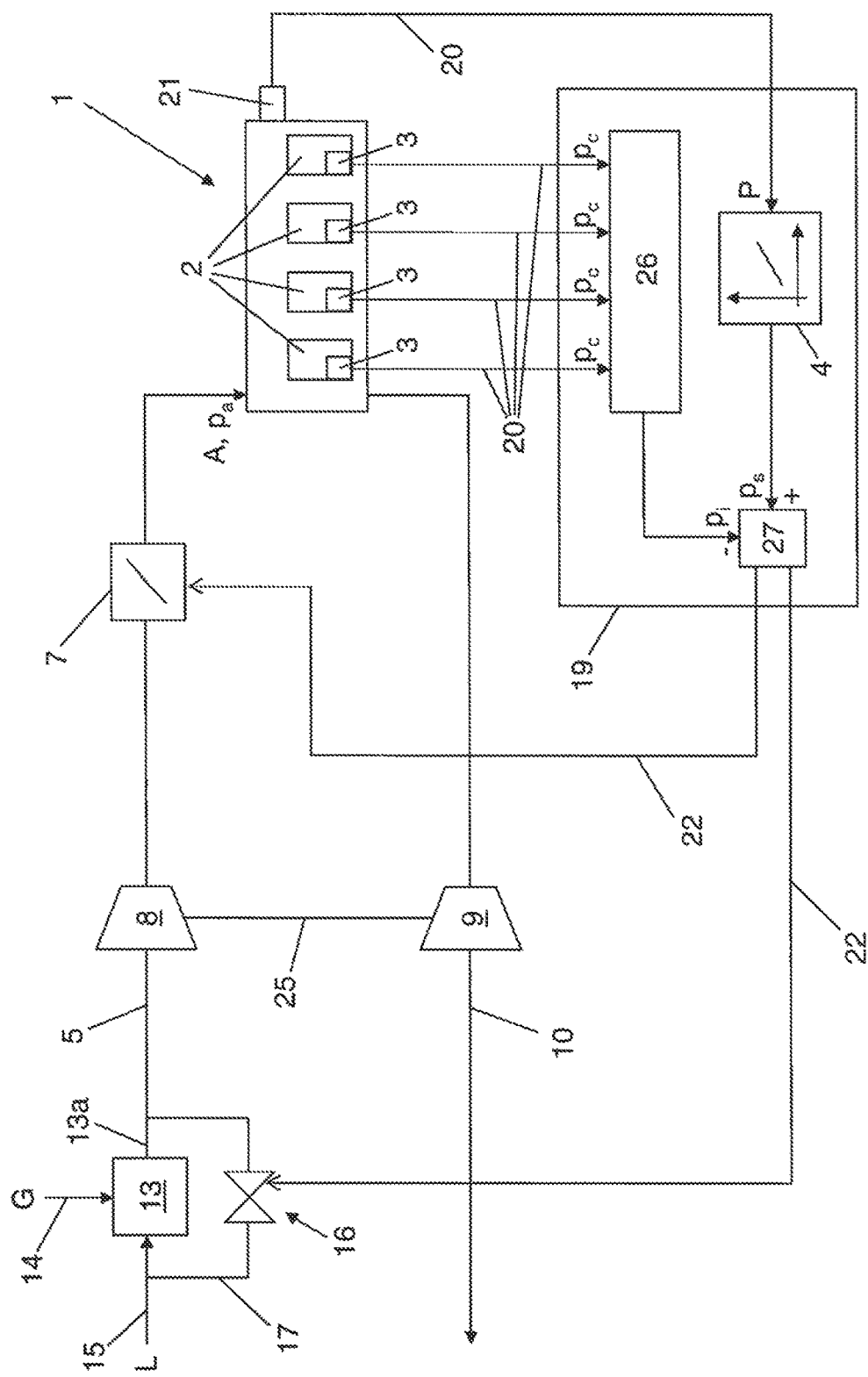

FIG. 4 shows a schematic diagrammatic circuit diagram of a further example of a proposed internal combustion engine 1. In this example, the internal combustion engine 1 is a mixture-charged gas engine in which the air feed conduit 5 is provided with a mixer 13. A fuel conduit 14 for introducing fuel G and an air conduit 15 for introducing air L open into the mixer 13. A mixer outlet 13a of the mixer 13 opens into the air feed conduit 5, by way of which the fuel-air mixture issuing from the mixer outlet 13a is introduced in the form of charge air A into the combustion chambers 2. In this embodiment, as the adjusting device, a mixer bypass valve 16 for bypassing the mixer 13 is arranged in a mixer bypass conduit 17 connecting the air conduit 15 directly to the mixer outlet 13a, wherein to alter a valve position of the mixer bypass valve 16, an adjusting signal can be signaled by the regulating device 19 to the mixer bypass valve 16 by way of a control line 22. In addition, as a further adjusting device, a throttle flap 17 is disposed in the air feed conduit 5, wherein to alter a position of the throttle flap 7, an adjusting signal can be signaled from the regulating device 19 to the throttle flap 7 by way of a control line 22.

Figure 5:
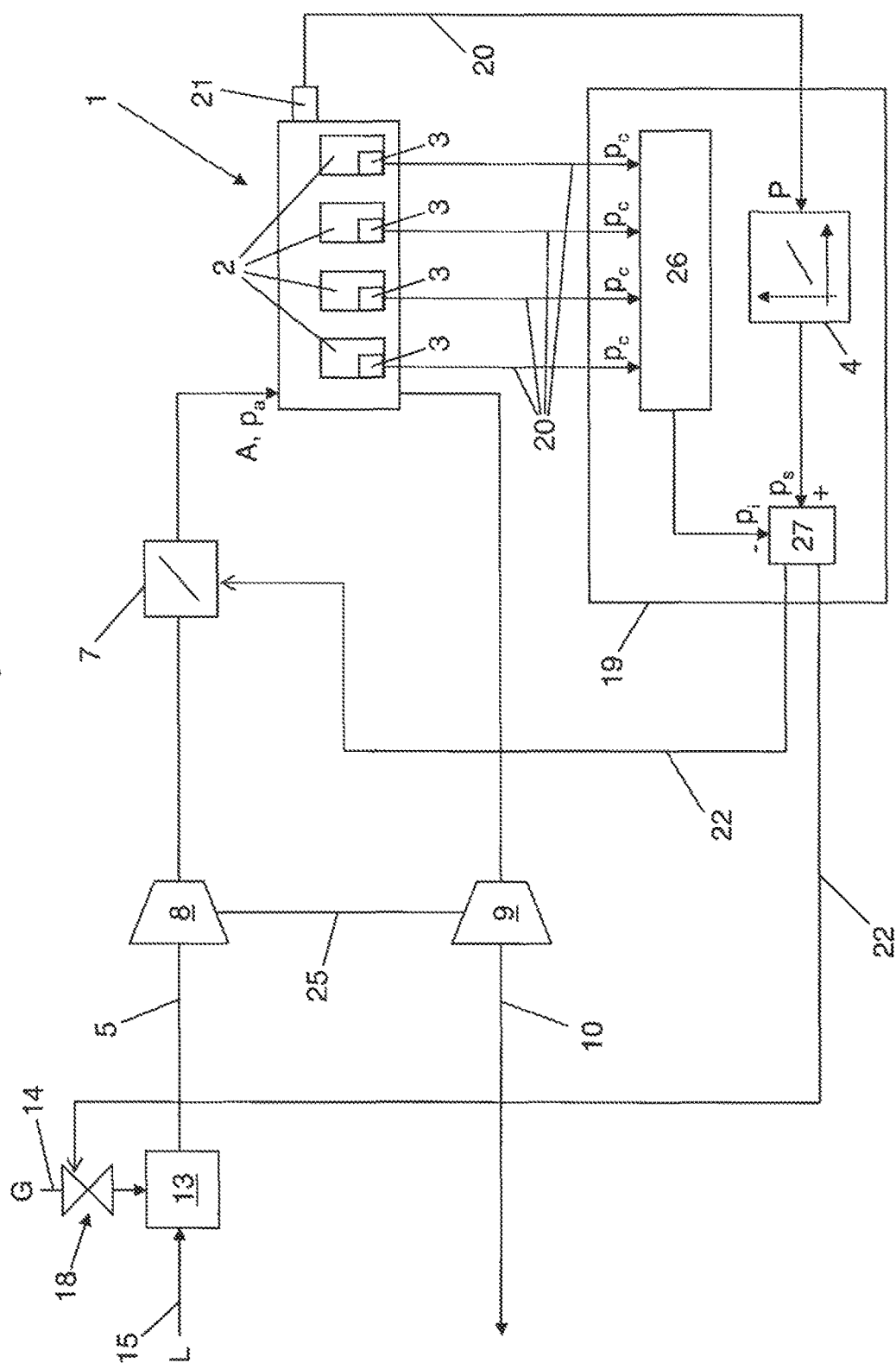

FIG. 5 shows a further example of an internal combustion engine 1 which is in the form of a mixture-charged gas engine and in which the air feed conduit 5 is equipped with a mixer 13. In this example, a fuel valve 18 is arranged in the fuel conduit 14 as the adjusting device, wherein to alter a valve position of the fuel valve 18 an adjusting signal can be signaled by the regulating device 19 to the fuel valve 18 by way of a control line 22.

Figure 6:
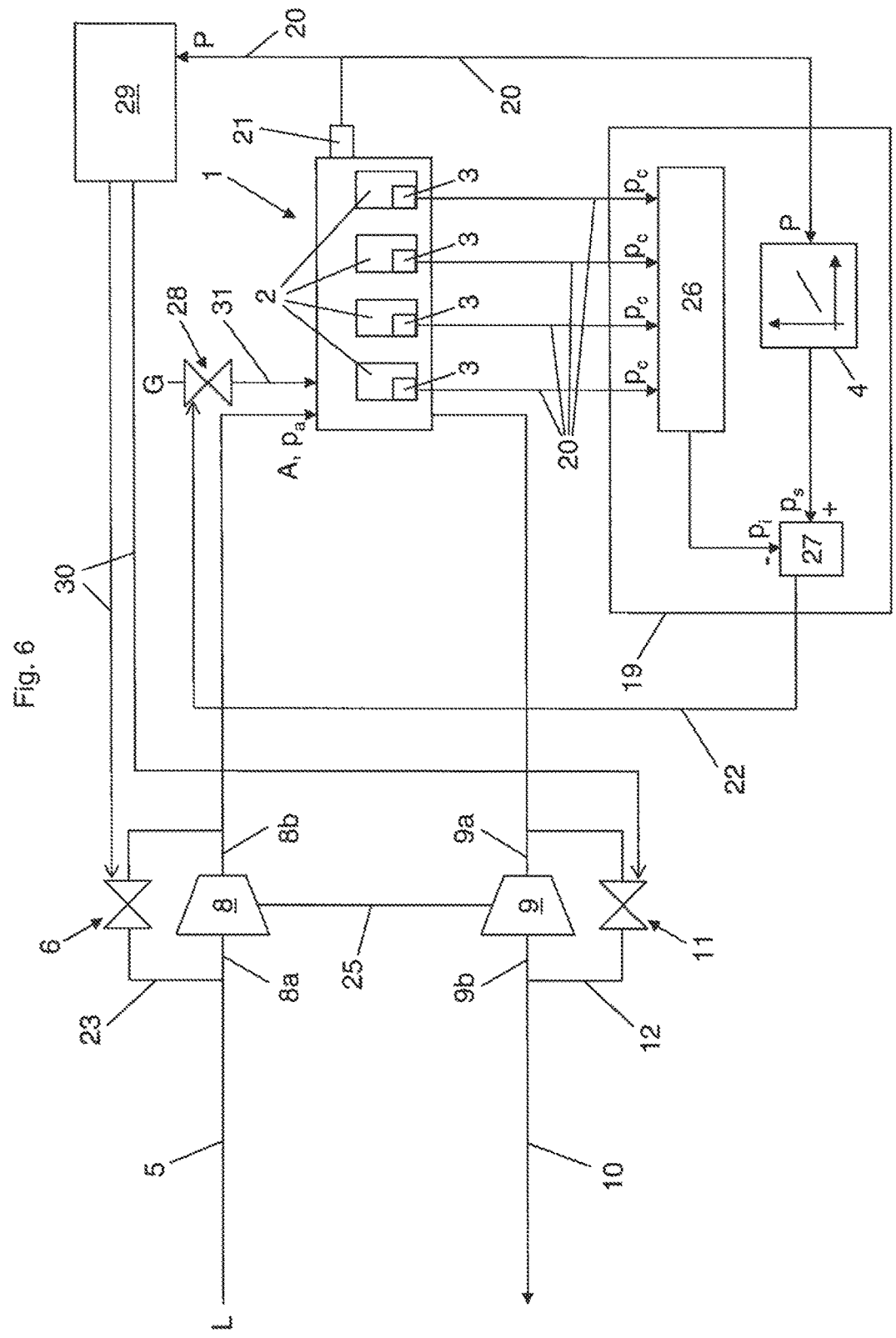

FIG. 6 shows a further example of an air-charged internal combustion engine 1. The combustion chambers 2 of the internal combustion engine 1 are fed with charge air A in the form of compressed air L by way of an air feed conduit 5 and fuel G by way of a fuel feed conduit 31. For metering the fuel G, the fuel feed conduit 31 is provided with at least one fuel metering valve 28. It can preferably be provided that a respective fuel metering valve 28 is provided for each combustion chamber 2 to permit cylinder-individual fuel metering.

For the sake of simplicity of the drawing, the Figures have shown only one fuel metering valve 28, usually at least one such fuel metering valve is naturally associated with each cylinder.

Therefore, a fuel-air mixture comprising the charge air A and the fuel G is fed to the combustion chambers 2. In this example, the at least one fuel metering valve 28 represents the adjusting device, wherein to alter a valve position of the at least one fuel metering valve 28, an adjusting signal can be signaled by the regulating device 19 to the at least one fuel metering valve 28 by way of a control line 22.

Upon a deviation in the cylinder pressure value $p_i$ from the cylinder pressure target value $p_s$, the fuel-air ratio of the fuel-air mixture is altered by that adjusting device. Due to that variation in the fuel-air ratio, an altered power output P of the internal combustion engine 1 would occur, without further interventions. A power regulator 29 provided in this example detects the power output P of the internal combustion engine 1, that is signaled by a power measuring device 21 by way of a signal line 20, and counteracts a change in power by signaling adjusting signals to a compressor bypass valve 6 and/or an exhaust gas turbine bypass valve 11 by way of suitable lines 30. The charge pressure $p_a$ of the charge air A is altered by a change in the valve position of the compressor bypass valve 6 and/or a gas turbine bypass valve 11. The cylinder pressure value $p_a$ is adjusted to the cylinder pressure target value $p_s$ by such a change in the charge pressure $p_a$ of the charge air A.

Figure 7:
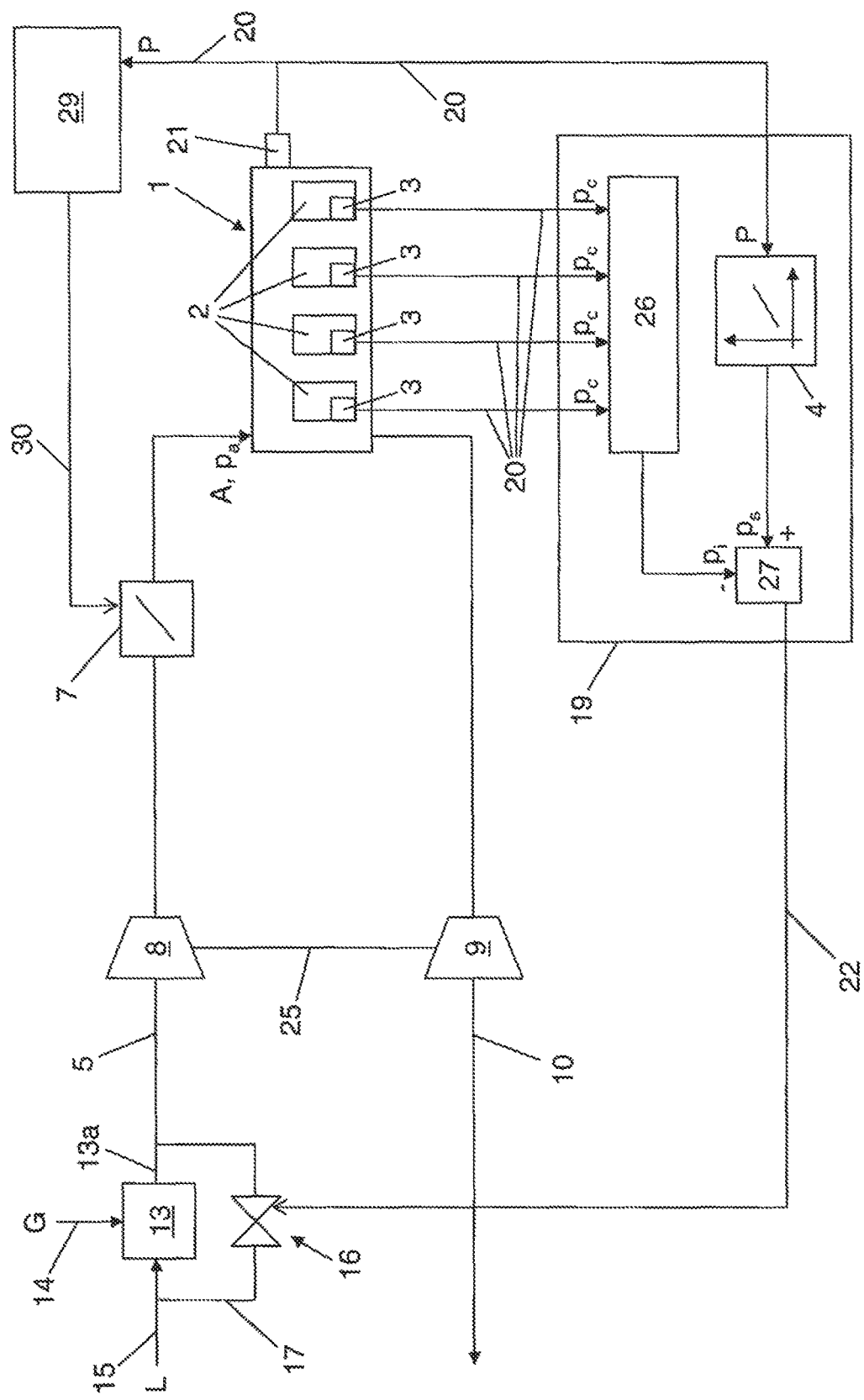

FIG. 7 shows a further example of a mixture-charged internal combustion engine 1 which, similarly to the engine 1 in FIG. 6, is equipped with a power regulator 29.

In this example, the charge air A fed to the combustion chambers 2 by way of the air feed conduit 5 is a fuel-air mixture which is formed in a mixer 13 and which comprises air L and fuel G. The mixer 13 is disposed in the air feed conduit 5, wherein a fuel conduit 14 for introducing fuel G and an air conduit 15 for introducing air L open into the mixer 13 and a mixer outlet 13a of the mixer 13 opens into the air feed conduit 5.

Similarly to the principle shown in FIG. 6, upon a deviation in the cylinder pressure value $p_i$ from the cylinder pressure target value $p_s$, the fuel-air ratio of the fuel-air mixture in the form of the charge air A is altered. In this case, that is effected by a change in the valve position of a mixer bypass valve 16 which for bypassing the mixer 13 is disposed in a mixer bypass conduit 17 directly connecting the air conduit 15 to the mixer outlet 13a.

Due to that change in the fuel-air ratio of the charge air A, a changed power output P of the internal combustion engine 1 would occur without further interventions. In this example, the power regulator 29 counteracts such a change in power by signaling an adjusting signal to a throttle flap 7 arranged in the air feed conduit 5 by way of a corresponding line 30. By virtue of a change in the position of the throttle flap 7, a mass of the charge air A or the charge pressure $p_a$ of the charge air A is altered. Due to such a change in the charge pressure $p_a$ of the charge air A, the cylinder pressure value $p_i$ is adjusted to the cylinder pressure target value $p_s$.

By virtue of the above-described control interventions in the adjusting devices—in the form of adjusting signals from the regulating device 19 to the adjusting devices—the charge pressure $p_a$ can be altered in such a way and for a time until the cylinder pressure value $p_i$ and the cylinder pressure target value $p_s$ are coincident so that, in spite of deviations with respect to the mass of air in the combustion chambers 2, by virtue of wear phenomena of components of the internal combustion engine 1, it is possible to keep a desired operating point for the internal combustion engine 1 in relation to power P and $NO_x$ emissions.

Figure 8:
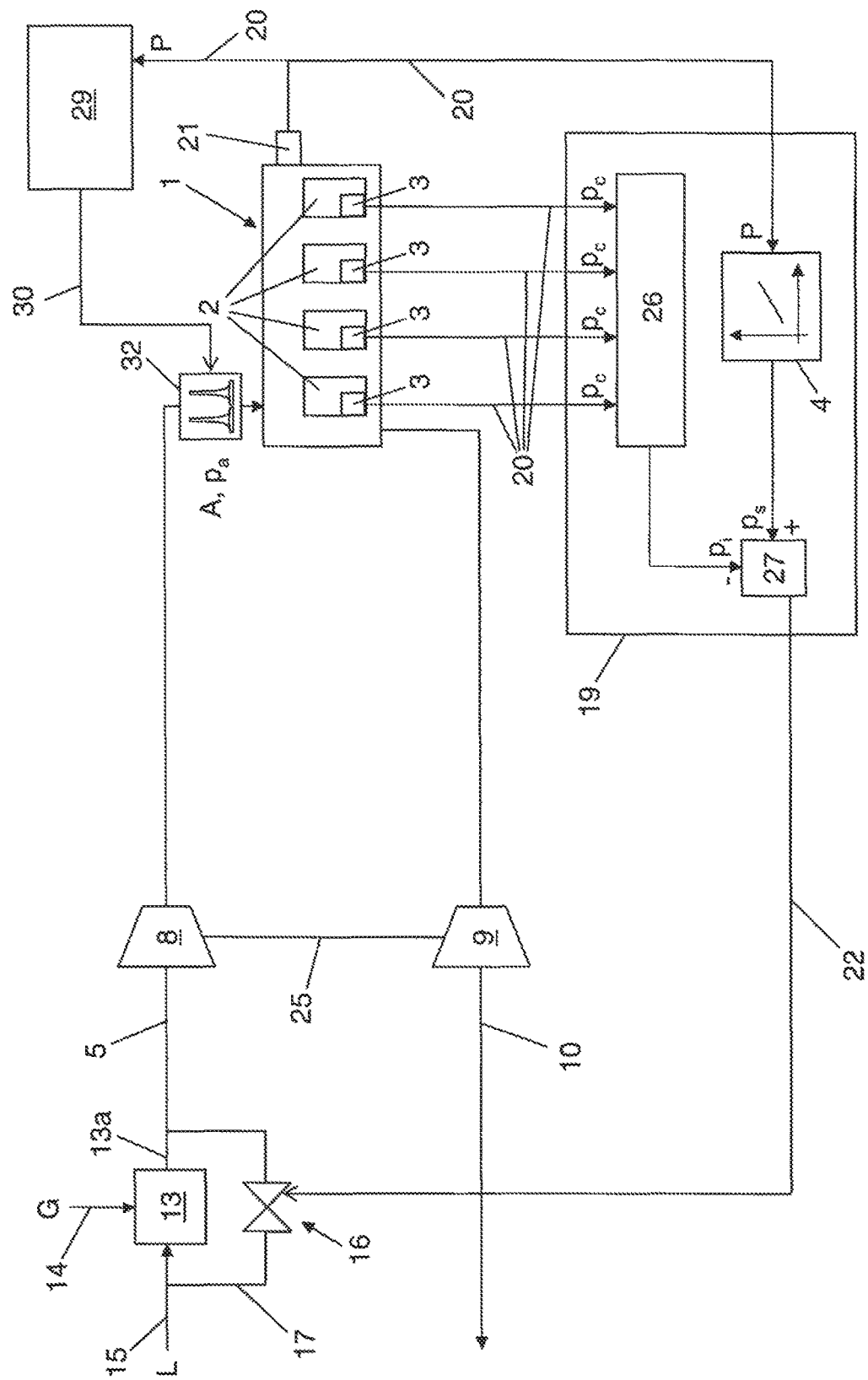

FIG. 8 shows a further example of a mixture-charged internal combustion engine 1 which, like the internal combustion engine 1 in FIG. 7, is equipped with a power regulator 29. In this example, the adjusting device is in the form of a variable valve gear 32, by way of which the amount of air fed to the at least one combustion chamber can be varied.

A power regulator 29 detects the power P of the internal combustion engine 1, that is signaled by a power measuring device 21 by way of a signal line 20, and counteracts a variation in power by signaling adjusting signals to the variable valve gear 32 by way of signal lines 30. With the variable valve gear 32, the valve opening times and/or the valve lift curves and/or the lobe separation of inlet and exhaust valves can be altered and thereby the amount (volume) of charge air A flowing into the combustion chamber can be varied. If, for example, the power delivered by the internal combustion engine 1 has to be increased, then the power regulator 29 signals a signal to the variable valve gear 32 so that the amount of charge air A to be let into at least one of the combustion chambers 2 has to be increased.

If the amount of charge air fed to a combustion chamber is increased, then a larger mass of air participates in compression and combustion and the cylinder pressure $p_i$ attains a higher value.

The setting of the variable valve gear 32 is altered until the cylinder pressure value $p_i$ is coincident with the cylinder pressure target value $p_s$. A variable valve gear 32 can be provided for all the above-indicated configurations. FIG. 8 therefore shows only one possible variant. Advantageously, when using a variable valve gear 32, it is possible to dispense with a throttle flap.

Figure 9:
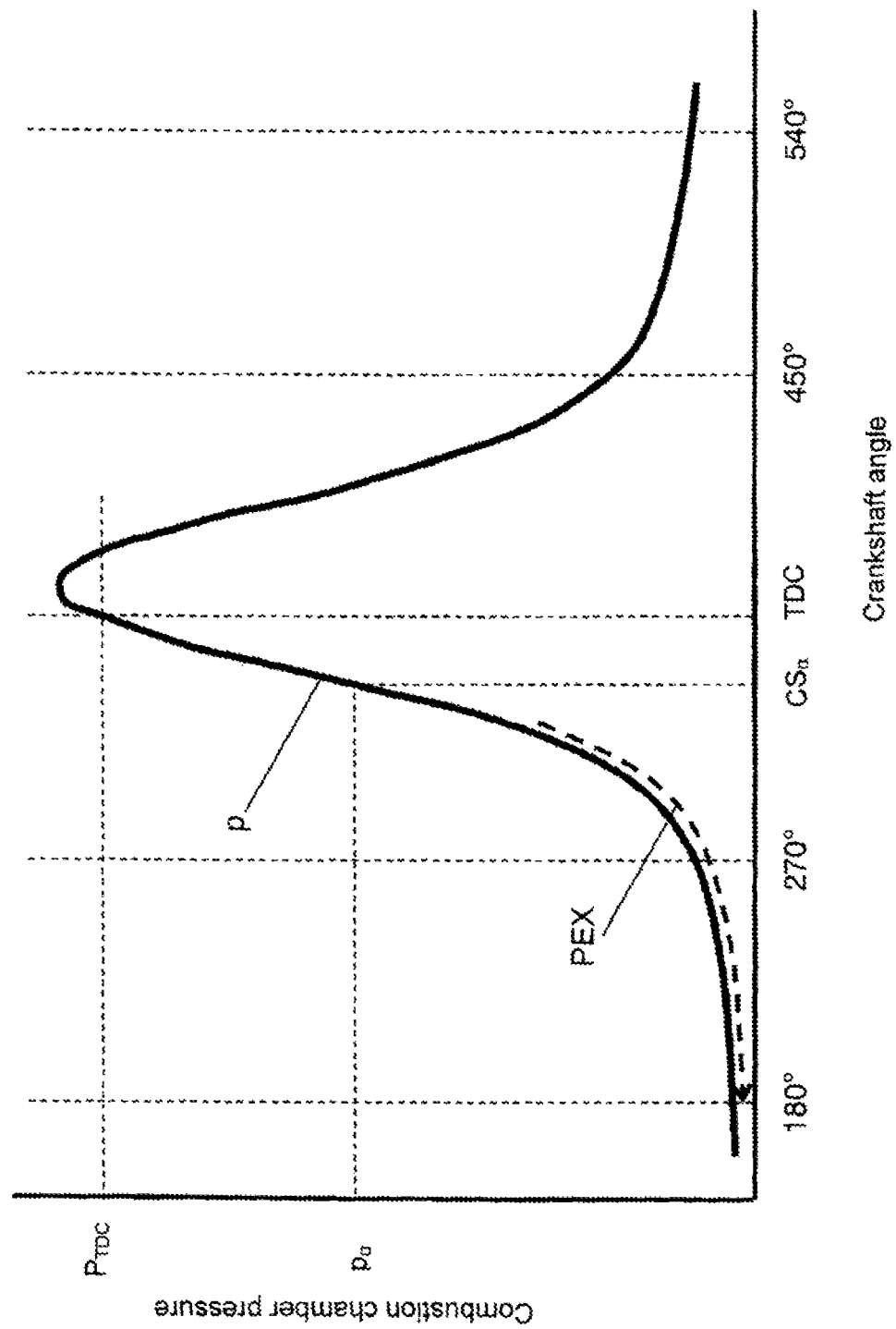

FIG. 9 diagrammatically shows the variation in cylinder pressure in an engine, plotted as a graph of combustion chamber pressure as the ordinate in relation to crankshaft angle as the abscissa. The angular positions and the pressure variation do not necessarily correspond to real factors, but are only intended to illustrate the above-described methods of ascertaining cylinder filling. In that respect, the symbols bear the following significance:

p variation in the cylinder pressure;
TDC crankshaft angle at the top dead center point;
$p_{TDC}$ cylinder pressure at the top dead center point;
$p_\alpha$ cylinder pressure at a first crankshaft angle $CS_\alpha$; and
PEX configuration, by way of example, of a polytropic extrapolation.

The broken line PEX shows a configuration, by way of example, of a polytropic extrapolation. As discussed in the description in the opening section, it is possible to calculate from a measurement value with respect to a cylinder pressure or an average of a plurality of values from a crankshaft angle range by way of polytropic extrapolation to any point on the compression curve. The curve PEX is deliberately shown as being somewhat spaced apart from the cylinder pressure configuration for the sake of better distinguishability, but it naturally extends in coincident relationship with the cylinder pressure configuration.

The invention claimed is:

1. A method of operating an internal combustion engine, comprising at least one combustion chamber to which a charge air is fed with a variable charge pressure or a variable amount of charge air, wherein a cylinder pressure value is ascertained from at least one measurement value of a sensor arranged in the at least one combustion chamber, wherein the cylinder pressure value is regulated by altering the charge pressure or by altering the amount of charge air as a setting value or values to a cylinder pressure target value, wherein the cylinder pressure target value is selected in dependence on a power of the internal combustion engine, wherein the at least one combustion chamber comprises at least two combustion chambers and the sensor is one of at least two sensors arranged in the at least two combustion chambers, respectively, wherein a cylinder-individual pressure value of each of the at least two combustion chambers is ascertained from at least one measurement value of the respective sensor, wherein the cylinder pressure value is ascertained from the cylinder-individual pressure values of the at least two combustion chambers, and wherein a median or an arithmetic mean value of the cylinder-individual pressure values of the at least two combustion chambers is ascertained as the cylinder pressure value.

2. A method of operating an internal combustion engine, comprising at least one combustion chamber to which a charge air is fed with a variable charge pressure or a variable amount of charge air, wherein a cylinder pressure value is ascertained from at least one measurement value of a sensor arranged in the at least one combustion chamber, wherein the cylinder pressure value is regulated by altering the charge pressure or by altering the amount of charge air as a setting value or values to a cylinder pressure target value, wherein the cylinder pressure target value is selected in dependence on a power of the internal combustion engine, and wherein the at least one measurement value is ascertained prior to an ignition in the at least one combustion chamber.

3. The method as set forth in claim 1, wherein the cylinder pressure target value is predetermined from an operating characteristic which contains an association of cylinder pressure target value with power of the internal combustion engine in dependence on the power of the internal combustion engine for substantially constant values for nitrogen oxide emissions.

4. The method as set forth in claim 1, wherein the charge air is fed to the at least one combustion chamber by way of an air feed conduit, and wherein the charge pressure is varied by adjustment of at least one adjusting device arranged in the air feed conduit.

5. The method as set forth in claim 1, wherein the charge air is fed to the at least one combustion chamber by way of an air feed conduit, and wherein the amount of charge air is varied by adjustment of a variable valve gear.

6. The method as set forth in claim 1, wherein the charge air is fed to the at least one combustion chamber by way of an air feed conduit equipped with a compressor, wherein the compressor is coupled to an exhaust gas turbine in an exhaust gas conduit of the internal combustion engine, wherein the charge pressure is varied by displacement of turbine blades of the exhaust gas turbine or by adjustment of an exhaust gas turbine bypass valve in the exhaust gas conduit, and wherein the exhaust gas turbine bypass valve is arranged for bypassing the exhaust gas turbine in an exhaust gas bypass conduit which directly connects an exhaust gas turbine inlet to an exhaust gas turbine outlet.

7. The method as set forth in claim 1, wherein a fuel-air mixture including the charge air is introduced into the at least one combustion chamber, and wherein the charge pressure is varied by adjustment of a fuel-air ratio of the fuel-air mixture, by the charge pressure of the charge air being adjusted in dependence on the power of the internal combustion engine upon or after a variation in the fuel-air ratio of the fuel-air mixture.

8. A regulating device for regulating a cylinder pressure value of an internal combustion engine equipped with at least one combustion chamber, wherein a charge air is introduced into the at least one combustion chamber by way of an air feed conduit of the internal combustion engine with a variable charge pressure or a variable amount of charge air, wherein the at least one combustion chamber is equipped with a sensor for determining the cylinder pressure, wherein at least one measurement value of the sensor is signaled to the regulating device by way of a signal line, wherein a power measuring device for ascertaining a power of the internal combustion engine is provided, wherein the power is signaled to the regulating device by way of a further signal line, wherein the regulating device ascertains the cylinder pressure value from the at least one measurement value of the sensor, and wherein, in the event of a deviation of the cylinder pressure value from a cylinder pressure target value dependent on the power of the internal combustion engine, the regulating device:

for altering the charge pressure, signals an adjusting signal by way of a control line to at least one adjusting device until the cylinder pressure value and the cylinder pressure target value coincide, or for altering the amount of charge air, signals an adjusting signal by way of a control line to a variable valve gear until the cylinder pressure value and the cylinder pressure target value coincide, wherein:

the at least one combustion chamber comprises at least two combustion chambers and the sensor is one of at least two sensors arranged in the at least two combustion chambers, respectively, a cylinder-individual pressure value of each of the at least two combustion chambers is ascertained from at least one measurement value of the respective sensor, and wherein the cylinder pressure value is ascertained from the cylinder-individual pressure values of the at least two combustion chambers, and a median or an arithmetic mean value of the cylinder-individual pressure values of the at least two combustion chambers is ascertained as the cylinder pressure value.

9. An internal combustion engine, comprising:

at least one combustion chamber equipped with a sensor for determining cylinder pressure, and a regulating device for regulating a cylinder pressure value of the internal combustion engine, wherein a charge air is introduced into the at least one combustion chamber by way of an air feed conduit of the internal combustion engine with a variable charge pressure or a variable amount of charge air, wherein the at least one combustion chamber is equipped with a sensor for determining the cylinder pressure, wherein at least one measurement value of the sensor is signaled to the regulating device by way of a signal line, wherein a power measuring device for ascertaining a power of the internal combustion engine is provided, wherein the power is signaled to the regulating device by way of a further signal line, wherein the regulating device ascertains the cylinder pressure value from the at least one measurement value of the sensor, and wherein, in the event of a deviation of the cylinder pressure value from a cylinder pressure target value dependent on the power of the internal combustion engine, the regulating device:

for altering the charge pressure, signals an adjusting signal by way of a control line to at least one adjusting device until the cylinder pressure value and the cylinder pressure target value coincide, or for altering the amount of charge air, signals an adjusting signal by way of a control line to a variable valve gear until the cylinder pressure value and the cylinder pressure target value coincide, wherein:

the at least one combustion chamber comprises at least two combustion chambers and the sensor is one of at least two sensors arranged in the at least two combustion chambers, respectively, a cylinder-individual pressure value of each of the at least two combustion chambers is ascertained from at least one measurement value of the respective sensor, and wherein the cylinder pressure value is ascertained from the cylinder-individual pressure values of the at least two combustion chambers, and a median or an arithmetic mean value of the cylinder-individual pressure values of the at least two combustion chambers is ascertained as the cylinder pressure value.

10. The internal combustion engine as set forth in claim 9, wherein a throttle flap is arranged as the adjusting device in the air feed conduit, and wherein, for altering a position of the throttle flap, an adjusting signal is signaled by the regulating device to the throttle flap by way of a control line.

11. The internal combustion engine as set forth in claim 9, wherein a compressor for compressing the charge air is arranged in the air feed conduit, and wherein the compressor is coupled to an exhaust gas turbine in an exhaust gas conduit of the internal combustion engine.

12. The internal combustion engine as set forth in claim 11, wherein a compressor bypass valve is arranged as the adjusting device for bypassing the compressor in a compressor bypass conduit which connects a compressor inlet directly to a compressor outlet, and wherein, to alter a valve position of the compressor bypass valve, an adjusting signal is signaled by the regulating device to the compressor bypass valve by way of a control line.

13. The internal combustion engine as set forth in claim 11, wherein the exhaust gas turbine has adjustable turbine blades as the adjusting device, and wherein, to alter a geometry of the turbine blades, an adjusting signal is signaled by the regulating device by way of a control line to the exhaust gas turbine.

14. The internal combustion engine as set forth in claim 11, wherein an exhaust gas turbine bypass valve is arranged as the adjusting device for bypassing the exhaust gas turbine in an exhaust gas bypass conduit which connects an exhaust gas turbine inlet directly to an exhaust gas turbine outlet, and wherein, to alter a valve position of the exhaust gas turbine bypass valve, an adjusting signal is signaled by the regulating device by way of a control line to the exhaust gas turbine bypass valve.

15. The internal combustion engine as set forth in claim 9, wherein a mixer is arranged in the air feed conduit, and wherein a fuel conduit for introduction of fuel and an air conduit for introduction of air open into the mixer and a mixer outlet of the mixer opens into the air feed conduit.

16. The internal combustion engine as set forth in claim 15, wherein, as the adjusting device, a mixer bypass valve for bypassing the mixer is arranged in a mixer bypass conduit connecting the air conduit directly to the mixer outlet, and wherein, to alter a valve position of the mixer bypass valve, an adjusting signal is signaled by the regulating device by way of a control line to the mixer bypass valve.

17. The internal combustion engine as set forth in claim 15, wherein a fuel valve is arranged in the fuel conduit as the adjusting device, and wherein, to alter a valve position of the fuel valve, an adjusting signal is signaled by the regulating device by way of a control line to the fuel valve.

18. The internal combustion engine as set forth in claim 9, wherein a fuel is introduced into the at least one combustion chamber by way of a fuel feed conduit, wherein at least one fuel metering valve is arranged in the fuel feed conduit as the adjusting device, and wherein, to alter a valve position of the at least one fuel metering valve, an adjusting signal is signaled by the regulating device by way of a control line to the at least one fuel metering valve.

19. The method as set forth in claim 1, wherein the at least one measurement value is ascertained prior to an ignition in the at least one combustion chamber in a range of between about 30 and 55 degrees crankshaft angle before a top dead center position of a piston delimiting the at least one combustion chamber.

20. The method as set forth in claim 1, wherein the at least one measurement value is ascertained prior to an ignition in the at least one combustion chamber, at a 35 degree crankshaft angle before a top dead center position of a piston delimiting the at least one combustion chamber or at a 49 degree crankshaft angle before the top dead center position of the piston.

21. The method as set forth in claim 4, wherein the at least one adjusting device is a compressor bypass valve or a throttle flap.

22. The regulating device as set forth in claim 8, wherein the at least one adjusting device is arranged in the air feed conduit or in an exhaust gas conduit of the internal combustion engine.

23. The method as set forth in claim 2, wherein the cylinder pressure target value is predetermined from an operating characteristic which contains an association of cylinder pressure target value with power of the internal combustion engine in dependence on the power of the internal combustion engine for substantially constant values for nitrogen oxide emissions.

24. The method as set forth in claim 2, wherein the charge air is fed to the at least one combustion chamber by way of an air feed conduit, and wherein the charge pressure is varied by adjustment of at least one adjusting device arranged in the air feed conduit.

25. The method as set forth in claim 2, wherein the charge air is fed to the at least one combustion chamber by way of an air feed conduit, and wherein the amount of charge air is varied by adjustment of a variable valve gear.

26. The method as set forth in claim 2, wherein the charge air is fed to the at least one combustion chamber by way of an air feed conduit equipped with a compressor, wherein the compressor is coupled to an exhaust gas turbine in an exhaust gas conduit of the internal combustion engine, wherein the charge pressure is varied by displacement of turbine blades of the exhaust gas turbine or by adjustment of an exhaust gas turbine bypass valve in the exhaust gas conduit, and wherein the exhaust gas turbine bypass valve is arranged for bypassing the exhaust gas turbine in an exhaust gas bypass conduit which directly connects an exhaust gas turbine inlet to an exhaust gas turbine outlet.

* * * * *